US006873271B2

United States Patent
Brachmann et al.

(10) Patent No.: US 6,873,271 B2
(45) Date of Patent: Mar. 29, 2005

(54) POWER SUPPLY

(75) Inventors: Markus Brachmann, Nuremberg (DE); Armin Feustel, Weitramsdorf (DE); Hans-Joachim Goetz, Nuremberg (DE); Peter Ott, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/634,430

(22) Filed: Aug. 5, 2003

(65) Prior Publication Data

US 2005/0029998 A1 Feb. 10, 2005

(51) Int. Cl.$^7$ ............................................. H03M 1/100
(52) U.S. Cl. ...................................... 341/110; 341/126
(58) Field of Search ................................ 341/144, 145, 341/155, 156, 126, 110, 137, 140, 103

(56) References Cited

U.S. PATENT DOCUMENTS 5,621,299 A * 4/1997 Krall .......................... 320/103

* cited by examiner

Primary Examiner—Michael Tokar
Assistant Examiner—John B Nguyen
(74) Attorney, Agent, or Firm—Gregory J. Murgia

(57) ABSTRACT

A power supply particularly suitable for high-speed optical data transmission employs readily available components to achieve desired voltage tolerances. More specifically, a voltage signal supplied to a load is converted into a digital signal and provided to a processor that derives a digital correction signal from the digital signal. The digital correction signal is then converted to an analog correction signal and is used by a feedback control circuit in the power supply to regulate the output voltage.

2 Claims, 1 Drawing Sheet

POWER SUPPLY

TECHNICAL FIELD

The invention relates generally to power supplies and, more specifically, to output voltage tolerance in power supplies.

BACKGROUND OF THE INVENTION

The advent of optical transmission in telecommunication systems has brought with it a need for power supplies that are capable of delivering to a load a voltage that is, within a close tolerance range, equal to a specified value. With optical transmission systems operating at ever higher transmission rates, conventional power supplies whose output voltage is controlled to within ±5%, or even ±10%, are not accurate enough. Such power supplies have proved unsuitable in, for example, 40 Gb/s transmission systems which use ultra-sensitive laser components, high speed modulator drivers, chips having a 2.5 Gb/s core frequency, and 20 Gb/s oscillators and power amplifiers, by way of example. Such transmission systems and their components and devices typically require supply voltages having a tolerance of ±2% over the lifetime of the system and under a wide range of normally expected environmental conditions.

As a practical matter, known power supplies cannot provide an output voltage having a tolerance of ±2% unless certain highly accurate and expensive components are used along with elaborate and expensive filtering and shielding. Even with these precautions, however, the effects produced by the aging of components are difficult, if not impossible, to counteract.

SUMMARY OF THE INVENTION

A power supply that is particularly suitable for high-speed optical data transmission uses readily available components to achieve desired voltage tolerances according to the principles of the invention. More specifically, a power supply according to the principles of the invention generates a voltage signal that is converted into a digital signal from which a processor derives a digital correction signal, which, in turn, is then converted to an analog signal for controlling voltage regulation circuitry in the power supply.

According to one illustrative embodiment, a power supply according to the principles of the invention includes a DC-to-DC converter that has an output for supplying a voltage to a load, circuitry for deriving a signal representative of the voltage supplied at the output, and a control circuit for controlling the voltage at the output in dependence upon the derived signal. The power supply further includes an analog to digital converter for deriving a digital representation of the voltage signal at the load and a processor for deriving a digital correction signal from the digital representation. The digital correction signal is converted to an analog correction signal by a digital to analog converter. The analog correction signal is combined with the voltage-representative signal in the DC-to-DC converter to then regulate the voltage supplied to the load.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION

Figure 1:
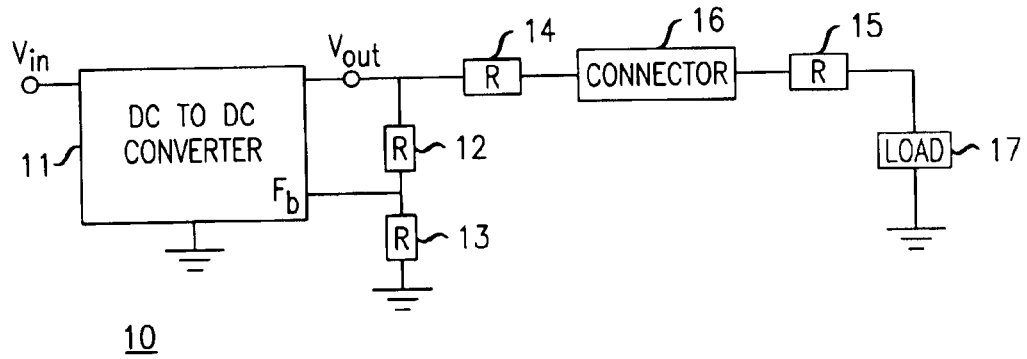
FIG. 1 is a schematic diagram of a power supply known in the prior art.

Referring now to FIG. 1, a power supply 10 known in the prior art is shown. Power supply 10 may be used, for example, in an electro-optical converter and the like. As shown, power supply 10 includes a DC-to-DC converter 11 having an input $V_{in}$, an output $V_{out}$, a feedback connection $F_b$, and a resistive divider network, comprising resistors 12 and 13, connected between output $V_{out}$ and ground. A load 17 is connected to output $V_{out}$ via, for example, a conventional connector 16. The resistance of the connection path between output $V_{out}$ and connector 16, and the resistance between connector 16 and load 17 are represented schematically by resistors 14 and 15, respectively. Connector 16, of course, also displays a certain resistance.

In operation, the voltage present at the junction of resistors 12 and 13 is representative of the voltage at the output $V_{out}$ and is applied to the feedback terminal $F_b$. A conventional control loop (not shown) in DC-to-DC converter 11 regulates the voltage at the output $V_{out}$ to be substantially constant. However, the control loop cannot cope, to the desired degree, with changes in component values as a result of aging or with changes in component values, in resistors 12 and 13 for example, due to temperature changes. In addition, changes in the resistance of the path connecting output $V_{out}$ to load 17 that occur with age and/or temperature are not compensated for at all. The cumulative effect of the tolerances of resistors 12 and 13, the tolerance of the internal reference voltage (not shown) of the DC-to-DC converter 11, a figure representative of the temperature stability of the internal reference voltage, and the variation with temperature of the resistance of the path connecting output $V_{out}$ to load 17, can easily lead to a voltage at load 17 having a tolerance of ±5%. Where load 17 is, for example, a voltage-critical component in a 40 Gb/s optical transmission system, a tolerance of ±5% is not acceptable.

This problem may be ameliorated to some extent by, for example, using resistors having a tolerance of ±0.1% for resistors 12 and 13, but this does not help with changes that occur with aging and temperature. Another way of increasing the accuracy of the voltage fed to load 17 involves the use of a sense line which feeds back the voltage applied to load 17 to the control loop in the DC-to-DC converter 11, thereby effectively including resistances 14, 15 and 16 in the control loop of the converter 11. However, where load 17 is a device or circuit operating at the very high bit rates common in optical transmission systems, the sense line picks up signals over a wide range of frequencies emanating from load 17 and other high speed devices in the vicinity. These spurious signals on the sense line interfere with the correct operation of the control loop in DC-to-DC converter 11, thus causing inaccuracies in the voltage applied to load 17. This problem may be mitigated to some extent by filtering and shielding of the sense line, but such a solution is considered elaborate and expensive.

Figure 2:
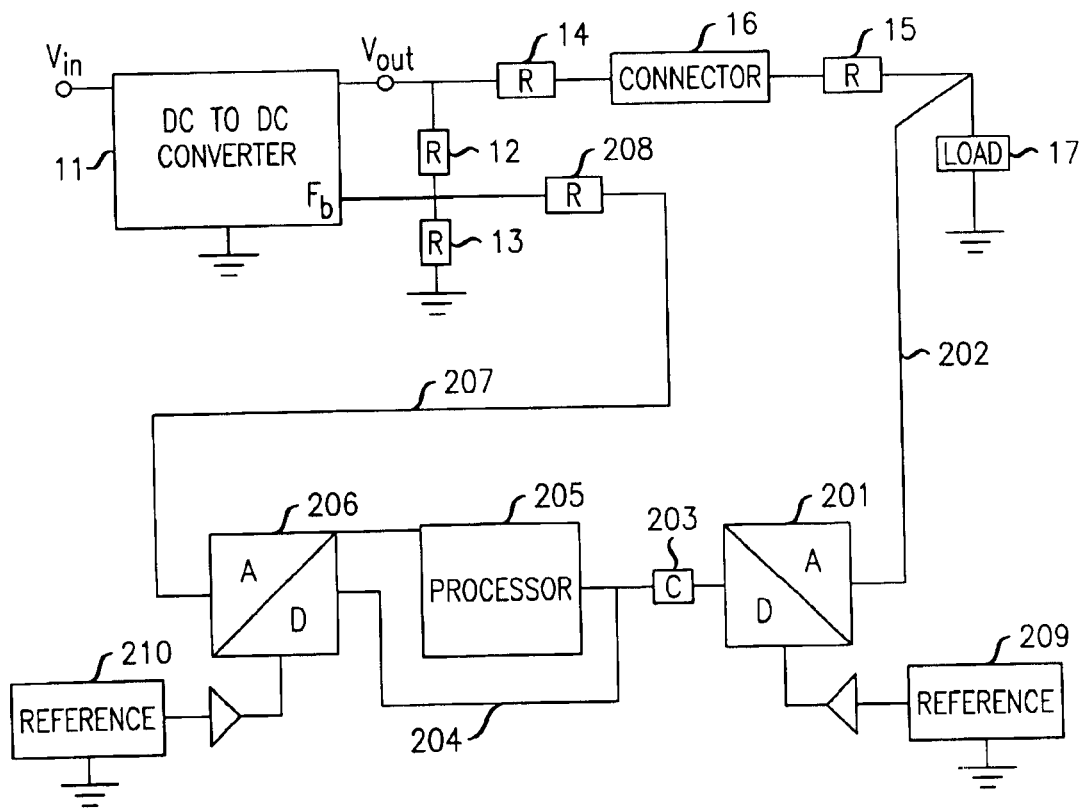
FIG. 2 is a schematic diagram of a power supply according to one illustrative embodiment of the invention.

Referring now to FIG. 2, a power supply 200 according to one illustrative embodiment of the invention is shown. In this embodiment, power supply 200 includes all components shown in power supply 10 in FIG. 1, which will not be described again for sake of brevity. According to the principles of the invention, power supply 200 includes additional components to reduce the tolerance range, i.e.

improve the accuracy, of the voltage applied to load 17. As will be appreciated by those skilled in the art, resistors 12 and 13 in the resistive divider network in FIG. 2 may, of course, have different values from those of resistors 12 and 13 in FIG. 1. An analog-to-digital (A/D) converter 201, located in this embodiment closely adjacent to load 17, receives, via connection path 202, the voltage applied to load 17 and converts it into digital form for application via connector 203 to a bi-directional data bus 204. As will be apparent to those skilled in the art, a uni-directional bus or buses may be used instead of bi-directional bus 204. The converted signal is supplied to processor 205, which may be a digital signal processor or field programmable gate array, or other digital controller and the like. Processor 205 may be a processor that is normally present in optical transmission apparatus for providing various functions on a time-shared basis concerned with the operation of the optical transmission apparatus as a whole. In dependence upon the digital representation received from A/D converter 201, processor 205 provides a digital correction signal on bi-directional data bus 204 to a digital-to-analog (D/A) converter 206, which converts the digital correction signal to analog form. This analog signal is provided via connection path 207 and resistor 208 for combination with the voltage-representative signal applied to the feedback terminal $F_b$ of DC-to-DC converter 11. The values of resistors 12, 13 and 208 are selected in accordance with well-known design principles having regard to other component values in the power supply as well as the characteristics of the control loop (not shown) in DC-to-DC converter 11.

It will be appreciated that, with the arrangement as described with reference to FIG. 2, the control loop within converter 11 controls the output voltage of $V_{out}$, and hence the voltage applied to load 17, in dependence upon the combined signal applied at terminal $F_b$, thereby substantially compensating both for variations in component values as aging occurs, and temperature dependent variations, including those in the path connecting $V_{out}$ to load 17. By locating the input of A/D converter 201 closely adjacent to load 17, the problem of pick-up of spurious or oscillatory signals on connection path 202 is substantially avoided, as is the need for complex and expensive filtering and shielding. A/D converter 201 and D/A converter 206 are provided with high precision reference inputs 209 and 210, respectively, in order to reduce the quantization error inherent in such converters.

To achieve a voltage tolerance of ±2%, or better, at the load 17, as required in many high speed optical transmission systems, A/D converter 201 and D/A converter 206 in one illustrative embodiment should each have a resolution of $2^{12}$ steps or better, and each of resistors 12, 13 and 208 should have a tolerance of ±0.1%. Other desired resolution and tolerance values for achieving different voltage tolerances will be apparent to those skilled in the art in view of the teachings herein.

It will be appreciated that where there are a number of loads each fed by a respective DC-to-DC converter, the simple provision of a multiplexer at the input of A/D converter 201 fed with the voltages of the various loads, a demultiplexer at the output of D/A converter 206 feeding correction signals to the respective DC-to-DC converters, and appropriate interconnecting uni- or bi-directional buses, enables processor 205 to generate all the necessary correction signals.

For the purpose of teaching the principles of the invention, various illustrative embodiments have been described herein. However, it will be apparent to the person skilled in the art that other alternative embodiments can be conceived and reduced to practice without departing from the spirit and scope of the invention, the scope of the invention being only limited by the claims appended hereto.

What is claimed is:

1. A power supply comprising:

a DC-to-DC converter including an output for connection to a load, a means for deriving a signal representative of the voltage at the output, and a control circuit for controlling the voltage at the output in dependence upon the derived signal;

means for connecting the output to the load;

means for deriving a digital representation of the voltage at the load;

a processor for deriving a digital correction signal from the digital representation;

means for converting the digital correction signal to an analog correction signal; and means for combining the analog correction signal with the derived signal, wherein the means for deriving a digital representation and the means for converting the digital correction signal each have a resolution of at least $2^{12}$ steps.

2. A power supply comprising:

a DC-to-DC converter including an output for connection to a load, a means for deriving a signal representative of the voltage at the output, and a control circuit for controlling the voltage at the output in dependence upon the derived signal;

means for connecting the output to the load;

means, for deriving a digital representation of the voltage at the load;

a processor for deriving a digital correction signal from the digital representation;

means for converting the digital correction signal to an analog correction signal; and means for combining the analog correction signal with the derived signal, wherein the means for connecting and the means for combining comprise resistive elements and wherein tolerances of the resistive elements and resolution of the means for deriving a digital representation and the means for converting the digital correction signal are selected such that the voltage supplied to the load has a tolerance equal to or better than approximately ±2%.

* * * * *